Sept. 15, 1964 E. T. HANDELMAN 3,149,298

NEEL EFFECT SWITCHING DEVICE

Filed Dec. 9, 1960

INVENTOR
E. T. HANDELMAN
BY H. W. Lockhart
ATTORNEY

United States Patent Office 3,149,298
Patented Sept. 15, 1964

3,149,298
NÉEL EFFECT SWITCHING DEVICE

Eileen T. Handelman, Short Hills, N.J., assignor to Bell Telephone Laboratories, Incorporated, New York, N.Y., a corporation of New York Filed Dec. 9, 1960, Ser. No. 74,866
6 Claims. (Cl. 338—22)

This invention relates to signal translating devices. More particularly, this invention relates to solid state devices which exhibit switching characteristics.

Certain crystalline compounds of the 3-*d* transition metals have been observed to exhibit substantial and relatively abrupt changes in their resistivity as the temperature of the crystal is varied through a temperature $T_c$ characteristic of the crystal. It is convenient to designate this temperature as the switching temperature. Typically, this resistivity is measured by subjecting the crystal to a constant current of known value and measuring the equilibrium voltage corresponding to a particular temperature as the compound is cooled or heated.

This invention is based to a considerable extent on the recognition that such a crystal also exhibits a useful switching characteristic when an applied bias is used to set its temperature slightly below the switching temperature and a control voltage is superimposed on the bias voltage.

Moreover, this invention is based on the recognition that the temperature dependency of the crystal unlike the temperature sensitive crystals of the prior art can be minimized.

In the art to which this invention is directed, there is a need for a practical, low cost switching arrangement exhibiting symmetrical current-voltage characteristics.

Therefore, in one broad aspect, an object of this invention is an improved solid state switching arrangement.

Another object is a simple, low cost switching device capable of symmetrical operation.

As far as is known at present, the property of rather abruptly changing resistivity at a characteristic temperature is exhibited by silver sulfide ($Ag_2S$), iron sulfide ($FeS$), vanadium pentoxide ($V_2O_5$), vanadium dioxide ($V_2O_4$), vanadium monoxide ($VO$), vanadium sesquioxide ($V_2O_3$) molybdenum trioxide ($MoO_3$). Other compounds of the 3-*d* transition metals should also exhibit the property.

These same materials also are known to exhibit substantial changes in their magnetic properties (termed the Néel effect) at a temperature (termed the Néel temperature) which is not necessarily the same as the above mentioned temperature characteristic of the abrupt resistivity changes. To facilitate the description of this invention, the materials noted above are hereinafter referred to collectively as Néel effect materials.

An elementary form of this invention comprises a crystal of Néel effect material coupled with a bias source and a control source. The bias source serves to keep the crystal close to its switching temperature and the control source is used to vary the temperature of the crystal about its switching temperature in response to control information.

In one specific embodiment of this invention the temperature of a pure stoichiometric, single crystal of Néel effect material is determined by an applied bias and subjected to a high frequency signal. For this high frequency operation the temperature of the crystal remains substantially constant, enabling switching of the applied signal at frequencies in the millimicrosecond range.

Accordingly, a feature of this invention is a Néel effect material utilized as the active element of a signal translating device.

Another feature of this invention is a suitably biased crystal of Néel effect material.

Further objects and features of this invention will become apparent during the following detailed description rendered in conjunction with the accompanying drawing, in which.

It is to be understood that the figures are not necessarily to scale in order to more adequately describe the nature of the invention.

Figure 1:
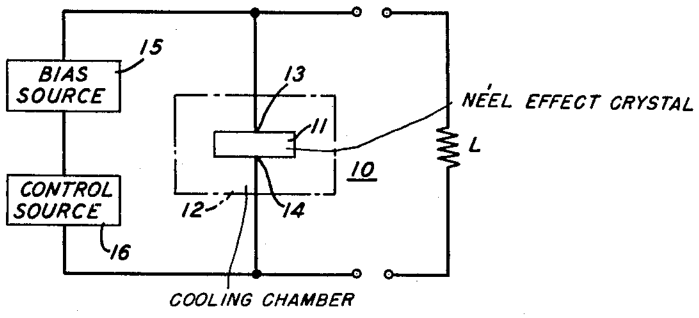
FIG. 1 is a basic circuit illustrating the use of a crystal of Néel effect material in accordance with this invention.

Referring now specifically to FIG. 1, a signal translating device 10 in accordance with this invention includes a crystal 11 of Néel effect material, typically a slice of vanadium sesquioxide about .03 x .03 x .01 inch. The temperature of the crystal is kept below the switching temperature (—110 degrees centigrade for vanadium sesquioxide) by cooling means 12 such as a bath of liquid nitrogen and alcohol, shown schematically by the broken line enclosure. The crystal is then connected serially by way of electrodes 13 and 14 with a direct current bias source 15 and a control source 16. A load L is connected in shunt across the crystal of Néel effect material as shown. Alternatively, the load can be connected serially.

In operation, the value of the applied bias voltage is increased until the temperature of the crystal, correspondingly, is increased, to just below its switching temperature, to a temperature conveniently termed the "quiescent" temperature of about —109 degrees centigrade. For a typical crystal of high purity vanadium sesquioxide of a practical size, such as that described, this value of bias voltage is apt to range from 20 volts to 185 volts for typical ambient temperatures of about —145 degrees centigrade to about —195 degrees centigrade. The control voltage is applied to vary the temperature of the crystal about its quiescent temperature. Control voltages of about five volts are commonly required to switch to and sustain the device in its low resistivity state.

Arrangements employing other Néel effect material in accordance with this invention would be similar to the above, varying only in the temperatures and voltages employed. More specifically, the switching temperature of Néel effect materials varies from low temperatures of, for example, —110 degrees centigrade for vanadium sesquioxide ($V_2O_3$) to temperatures of, for example, 80 degrees centigrade for vanadium dioxide ($V_2O_4$). For proper operation of signal translating devices in accordance with this invention, it is advantageous to fix the ambient temperature below the switching temperature of the specific crystal chosen and then to raise the crystal to a quiescent temperature close to the switching temperature by a biasing source as described.

Figure 2:
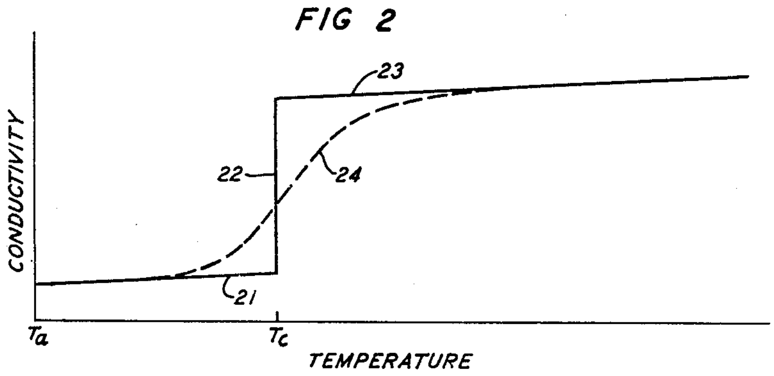
FIG. 2 is a graph of conductivity versus temperature for a typical Néel effect material.

FIG. 2 is a curve representing the conductivity versus temperature characteristic of a Néel effect crystal. The portion 21 of the curve indicates a substantially constant but low conductivity. At the switching temperature, conductivity increases abruptly by as much as six orders of magnitude as indicated by portion 22 of the curve. The portion 23 illustrates the substantially constant but relatively high conductivity exhibited by the material after the change of phase.

It is to be emphasized that the change in resistivity occurs at a temperature unique to the particular Néel effect crystal employed. This change is less abrupt if the material is not stoichiometric, contains impurities, is not single crystal or includes other defects. Accordingly, a plot of conductivity versus temperature for a defective crystal would follow broken line 24 rather than line 22. It appears, at present, that mixtures of materials would not exhibit any substantial and abrupt change in resistivity at all. However, for single crystals of vanadium sesquioxide, resistivity has been observed to change by a factor of a million at the switching temperature.

Figure 3:
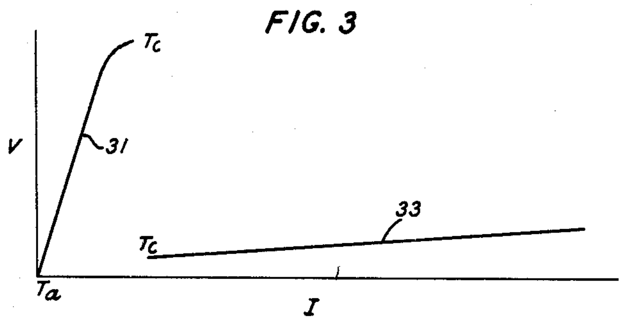
FIG. 3 is a typical current-voltage characteristic exhibited by a crystal of Néel effect material.

Corresponding changes to those described above for resistivity appear in the current-voltage characteristic. FIG. 3 illustrates a typical current-voltage characteristic for a Néel effect material. Portion 31 of the curve corresponds to portion 21 of FIG. 2. It can be seen from the figure that in this range current increases with increasing voltage. At the applied voltage which results in the crystal reaching the switching temperature the characteristic appears momentarily unstable and then is characterized by portion 33 of the curve, current increasing rapidly with voltage.

Apparently, the instability of the characteristic corresponds to the change in phase of the crystal lattice. In order to increase the frequency at which such a crystal can be switched, the speed at which the change of phase takes place is increased. This is accomplished by reducing the thermal capacity of the crystal and increasing the thermal dissipation. The thermal capacity of a crystal is reduced by decreasing the size of the crystal remembering, as is well known in the art, that the cross section area of the current path is important in determining the voltage required to switch the device from the high resistance to the low resistance portion of its V-I characteristic. The thermal dissipation is increased by connecting the crystal to a heat sink such as a large area metallic contact.

Considering a stoichiometric, pure, single crystal of vanadium dioxide, the switching temperature is found to be about 80 degrees centigrade. A bias applied between two separate ohmic contacts to this crystal determines a corresponding power input to the crystal. The excess $\Delta P$ of power input over the power dissipated is used to increase the temperature of the crystal from the ambient temperature. By preselecting a suitable value of bias voltage, the temperature of the crystal can be raised to the switching temperature. However, at this temperature the excess power $\Delta P$ produces a change in phase, at a constant temperature, but is not sufficient to maintain the change when the crystal exhibits its low resistivity state. Accordingly, the crystal oscillates at its characteristic temperature between its high and low resistivity states.

This same crystal of vanadium dioxide can be made to switch by determining the value of the applied voltage necessary to sustain a temperature different from the switching temperature, remembering that the ambient temperature is less than the switching temperature. Under steady state conditions, then, the crystal will exhibit either a high resistivity or a low resistivity depending on whether the selected bias value sustains a temperature respectively less than or greater than the switching temperature.

Considering specifically the case where the bias voltage sustains a steady state temperature less than the switching temperature, a superimposed signal of suitable amplitude switches the crystal alternatingly from its high resistivity to its low resistivity state, a larger amplitude being required the lower the quiescent temperature. When the quiescent temperature exceeds the switching temperature similar signals are required but the operation is 180 degress out of phase with the above operation.

Often in practical applications the ambient temperature is found to vary. A bias voltage sufficient to sustain a given temperature may not be sufficient if the ambient temperature decreases. In the case of the operation as an oscillator, the ambient temperature advantageously is fixed. In the case of the operation as a switch, the amplitude of the signal voltage is increased to insure proper performance under conditions of varying ambient temperature.

If the ambient temperature exceeds the switching temperature, cooling means is required. Therefore, in operation with vanadium sesquioxide which as a switching temperature of about —110 degress centigrade the crystal is immersed in a bath of liquid nitrogen and alcohol.

It is indicated above that the operation of this temperature sensitive crystal as an oscillator corresponds to a change of phase at a constant temperature. So too the high frequency operation of the crystal corresponds to a change of phase at a constant temperature. Specifically, the switching characteristic corresponds to the change of phase. As low frequency signals are applied, the temperature of the crystal may be observed to change. All that is required, however, is that the crystal changes phase. This can be accomplished at a substantially constant temperature. Accordingly, as signals of higher and higher frequency are employed, the temperature variation is reduced until ultimately no temperature variation is observed.

One specific device in accordance with this invention was fabricated from a slice of vanadium sesquioxide .03 x .03 x .01 inch. A separate point contact was positioned at opposite faces of the slice. Upon testing, the material exhibited an abrupt change in conductivity at —110 degrees centigrade. Accordingly, the slice was immersed in a bath of liquid nitrogen and ethyl alcohol to lower the ambient temperature to —144 degrees centigrade and was connected in series with a variable direct current power supply. In operation, the bias voltage required to switch the slice from its high resistance to its low resistance state was 115 volts. The sustained voltage was five volts and a current of .4 milliampere was observed before breakdown.

A signal having an amplitude of three volts was superimposed on a bias voltage of 114 volts. A switching characteristic was observed switching alternatingly from the high to the low resistance portions in less than a microsecond.

The slice also was made to oscillate by maintaining a bias of 115 volts.

A mechanically sturdy contact to each face of the above slice of vanadium sesquioxide is fabricated as follows: Evaporate in a manner well known in the art a dot of titanium 3.0 mils in diameter and 1,000 Angstroms thick. Evaporate a layer of silver 10,000 Angstroms thick to cover the dot and heat to 300 degrees centigrade for five minutes. The resulting contact is explained in detail in copending application Serial No. 74,872, filed December 9, 1960, for M. P. Lepselter, now Patent 3,106,489, issued October 8, 1963.

No attempt has been made to describe all possible embodiments of the invention. It should be understood that the embodiments described are merely illustrative of the preferred form of the invention and various modifications may be made therein without departing from the spirit and scope of this invention.

What is claimed is:

1. A signal translating system including a signal translating means comprising as an active element a body of a single compound selected from a group of compounds of the 3–*d* transition metals which exhibits a substantial and abrupt change in conductivity at a characteristic temperature, coupled with means for reducing the ambient temperature below —110 degrees centigrade, electrical input means for raising the temperature of said active element from the ambient temperature to said characteristic temperature, and signal means for varying the temperature of said crystal about said characteristic temperature.

2. A signal translating system including a signal translating means comprising as an active element a body of a single compound selected from a group of compounds consisting of vanadium pentoxide, vanadium dioxide and vanadium sesquioxide which exhibits a substantial and abrupt change in conductivity at a characteristic temperature, coupled with means for reducing the ambient temperature below —110 degrees centigrade, biasing input means for raising the temperature of said active element from the ambient temperature to said characteristic temperature, and a signal input means superimposed on said biasing input means for varying the temperature of said active element about said characteristic temperature for producing a symmetrical switching characteristic.

3. A high frequency signal translating system including a signal translating means comprising an active element selected from a group of compounds consisting of pure, single crystal, stoichiometric vanadium pentoxide, vanadium dioxide and vanadium sesquioxide which exhibits a change in phase at a characteristic temperature, coupled with biasing input means for raising the temperature of said active element from the ambient temperature to said characteristic temperature, and a single input means superimposed on said biasing input means for changing the phase of said active element at said characteristic temperature.

4. A signal translating system including a signal translating means comprising a crystal of vanadium sesquioxide which exhibits a change in conductivity by a factor of a million at about —110 degrees centigrade, coupled with means for reducing the ambient temperature below —110 degrees centigrade, biasing means for raising the temperature of said crystal to the vicinity of —110 degrees centigrade, and signal means for varying the temperature of said crystal about —110 degrees centigrade for producing a symmetrical switching characteristic.

5. A high frequency signal translating system including a signal translating means comprising a single crystal of pure stoichiometric vanadium sesquioxide which exhibits a change in phase at about —110 degrees centigrade, coupled with means for reducing the ambient temperature below —120 degrees centigrade, biasing means for raising the temperature of said crystal to —120 degrees centigrade, and signal means for varying the phase of said single crystal at —120 degrees centigrade.

6. A high frequency translating system including a signal translating means comprising a single crystal of pure, stoichiometric vanadium dioxide which exhibits a change in phase at about 80 degrees centigrade, means for raising the temperature of said single crystal to about 80 degrees centigrade, and means for varying the phase of said crystal at about 80 degrees centigrade to produce a symmetrical switching characteristic.

References Cited in the file of this patent

UNITED STATES PATENTS

| | | |
|---|---|---|
| 2,609,470 | Quinn | Sept. 2, 1952 |
| 2,700,720 | Torok | Jan. 25, 1955 |
| 2,832,897 | Buck | Apr. 29, 1958 |
| 3,056,889 | Nyberg | Oct. 2, 1962 |